P. J. RENNOLDS.
TIDE WATER POWER.
APPLICATION FILED MAY 27, 1919.
1,333,443.
Patented Mar. 9, 1920.
3 SHEETS—SHEET 3.
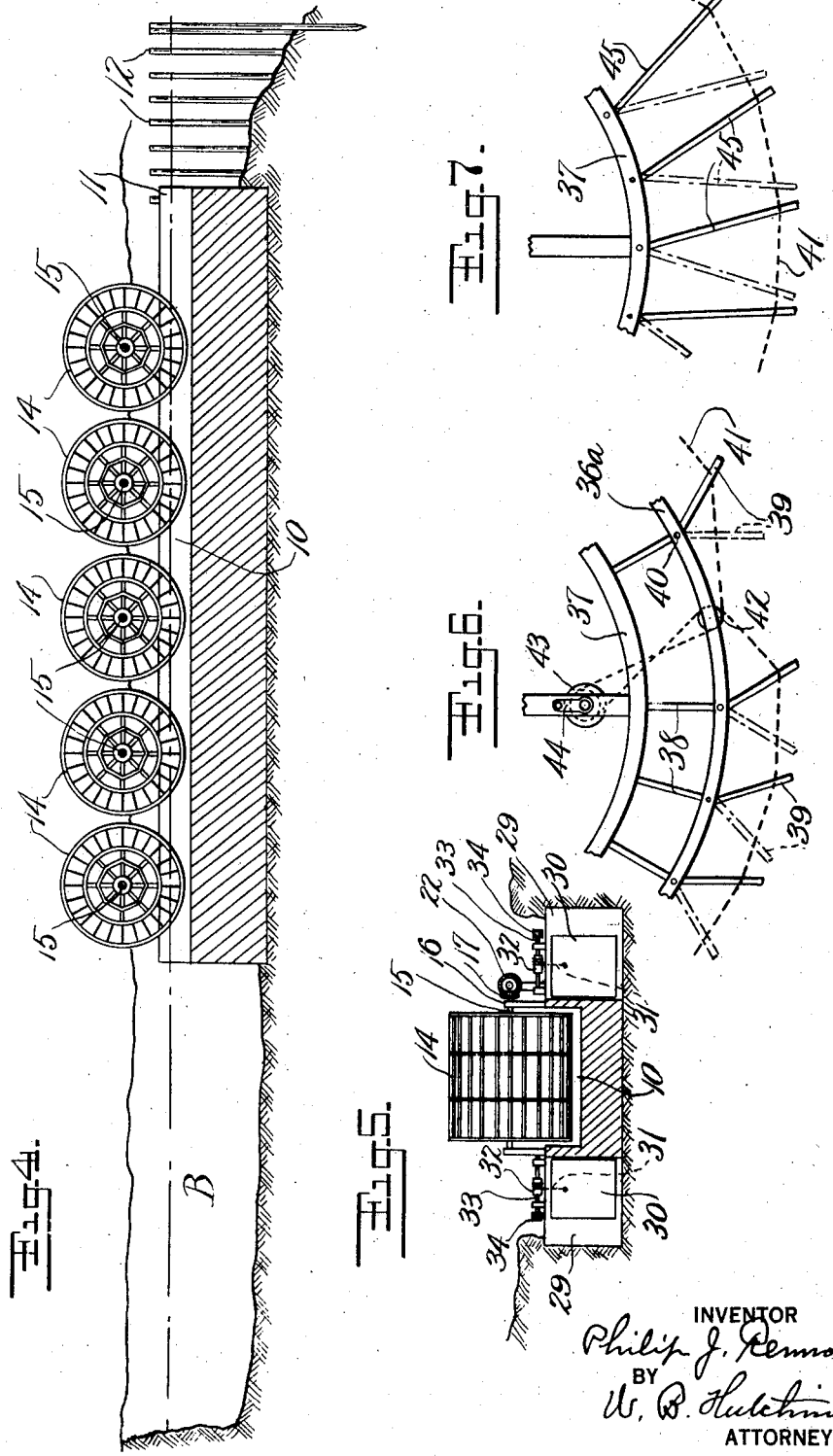

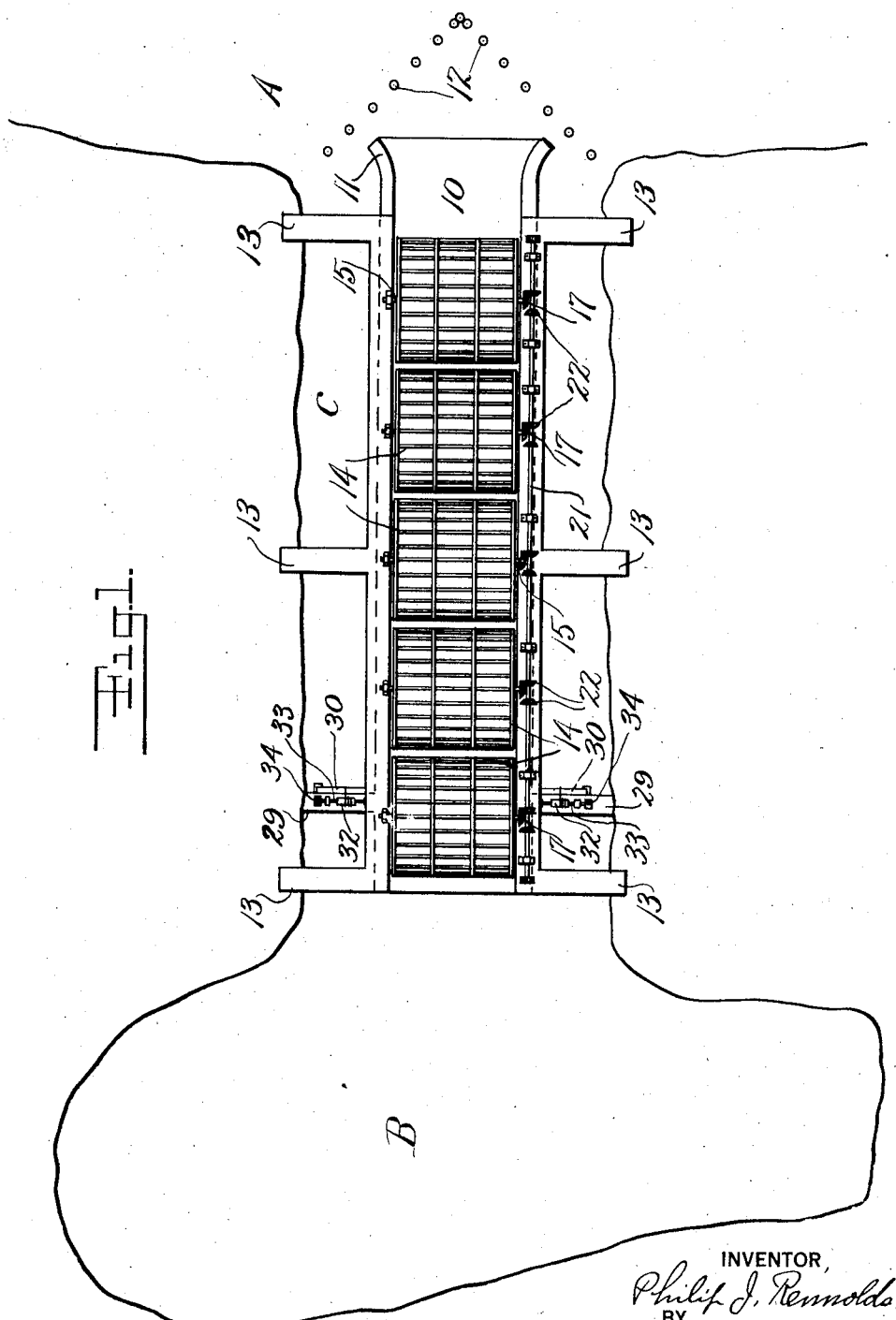

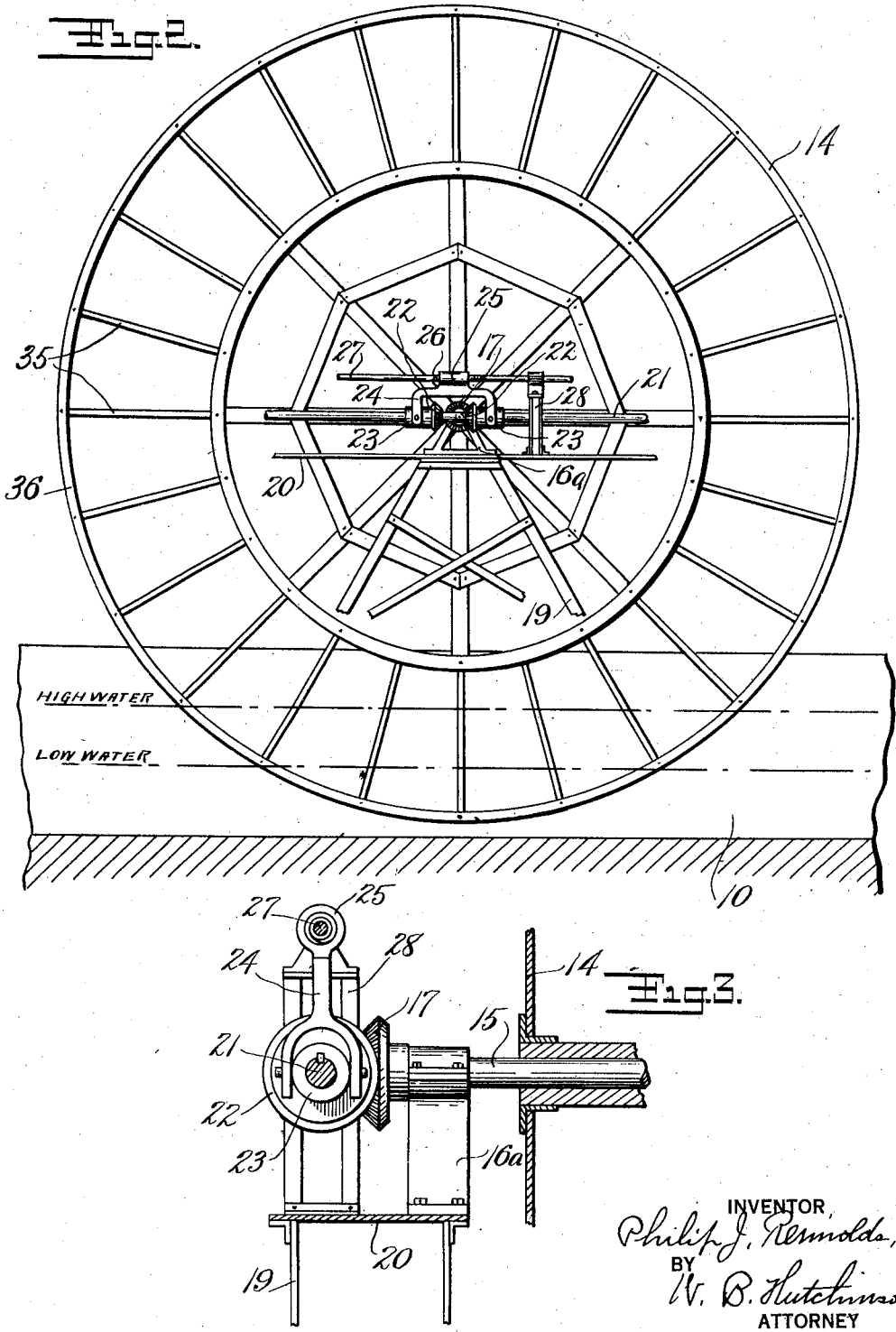

UNITED STATES PATENT OFFICE.

PHILIP J. RENNOLDS, OF NEW YORK, N. Y.

TIDE-WATER POWER.

1,333,443.  Specification of Letters Patent.  Patented Mar. 9, 1920.

Application filed May 27, 1919. Serial No. 300,085.

*To all whom it may concern:*

Be it known that I, PHILIP J. RENNOLDS, a citizen of the United States, and a resident of the city, county, and State of New York, have invented a new and useful Improvement in Tide-Water Power, of which the following is a full, clear, and exact description.

My invention relates to improvements in apparatus for utilizing the flow of tide water to convert it into commercial power. My invention is intended especially to produce an apparatus which can be used in very large units to generate power for commercial use in great quantities so as to supply cities, towns, commercial districts, and the like. My invention is further an apparatus which does not relate so much to detail construction as to the general organization of a power plant adapted to produce power on a large scale, and the object of my invention is to produce a simple and reliable apparatus which can be installed at relatively small expense compared to the great amount of power generated, and which will utilize both the ebb and flow of the tide with one piece of apparatus, so as to get the maximum amount of power from the tide. In carrying out this idea I preferably arrange my apparatus at a point where there is a natural basin into which the tide ebbs and flows from the ocean or some part thereof, and locate my apparatus in the channel connecting the basin and the sea, although obviously an artificial basin might be created, or an artificial channel, or either or both can be improved. In carrying out my invention I arrange a raceway connecting the sea and the basin through which the tide will flow in and out, and in this raceway I arrange a series of very large under-shot wheels, one behind the other, so that the flow of water through the raceway will turn the whole series of wheels, and from these power can be taken and converted and distributed in any approved way, as for instance by converting it into electrical energy, operating air compressors, or the direct application of the power as circumstances may require. I preferably gear the whole series of wheels to a common driving shaft, and also have made provision whereby the wheels which will obviously turn one way when the tide is coming in, and in the opposite direction when the tide is going out, will give a constant motion to the power shaft to which the wheels are connected. My invention also relates to further improvements in the construction of the tide water power which will be hereinafter more particularly defined and claimed.

Reference is to be had to the accompanying drawings forming a part of this specification, in which similar reference characters indicate corresponding parts in all the views.

Figure 1 is a plan view more or less diagrammatic of an apparatus showing my invention.

Fig. 2 is a broken side elevation on a very much enlarged scale, showing the arrangement of one of the water wheels in its raceway.

Fig. 3 is a detail section of one form of shifting gear for connecting the wheel with the power shaft.

Fig. 4 is a sectional elevation partly diagrammatic, showing the general arrangement of the wheels.

Fig. 5 is a cross section through the raceway and shows gates for partially controlling the tide as hereinafter explained, and Figs. 6 and 7 are details of modified forms of wheels which can be used.

In Fig. 1 we will let A represent the sea or some branch thereof where there is a tide; B a basin; and C a channel connecting the basin with the sea. Extending lengthwise of the channel is a raceway 10 in which the water wheels are arranged, and this can be made of concrete or other suitable material, and it can be provided at one or both ends with a flaring mouth 11, while opposite this at the same end is arranged a suitable grid 12 which can be formed by spiles or the like, to prevent ice or other matter flowing too freely into the raceway. I have also shown the raceway provided with arms 13 extending across the channel to the adjacent land and adapted to support any necessary superstructure, but it will of course be understood that the power house and other accessories can be arranged as desired, and have nothing to do with this invention. The wheels 14 can be any approved undershot wheels, and they are arranged in series one behind the other so that the current flowing through the raceway can be utilized to its maximum extent. The wheels should be of very large diameter, and their blades will dip into the tide flowing through the raceway. Each wheel is secured to an axle or shaft 15 turning in suitable supports 16 (see Fig. 5) and in detail the supports can be brackets 16ª mounted on a supporting platform 20 hereinafter referred to. The wheels 14 can gear to a common power shaft 21 in any suitable and convenient manner, but preferably by shifting gears, and I have shown each wheel 14 driving a beveled gear wheel 17 meshing with sliding gears 22 which are keyed so as to slide on and turn with the power shaft 21, and are spaced apart as shown in Figs. 2 and 3. The hubs 23 of the gear wheels 22 are connected by a yoke 24 which has a nut 25 connected with the threaded portion 26 of a shifting rod 27 which can be turned manually or otherwise, and as each pair of gear wheels 22 is connected with the shifting rod it will be seen that they may all be shifted together by turning the rod 27, and thus a constant direction can be given to the power shaft 21. For instance, when the tide is flowing in one direction, the right hand wheel 22 of each pair will connect with the gears 17 of each wheel, and when the tide and the current changes, the gears 22 will be shifted so as to bring the left hand gears 22 into engagement with the gears 17. The shaft 21 is shown supported in brackets 28 which like the brackets 16ª are mounted on the platform 20, and this is supported on a framework 19 adjacent to each wheel, and thus if the wheels are very large the platform will enable a person to walk along adjacent to the wheels so as to inspect them or perform any necessary work thereon.

There is a period at about the turn of the tide when work cannot be carried on effectively, and it is desirable to let the water out of the basin B quickly just before the turn of the tide. To this end I have provided sluice gates for controlling the outflow and also the inflow of water, and these can be made high enough to impound any abnormally high tide which may flow into the basin. To this end a dam 29 is run across the channel C, and gates 30 are arranged to cover large openings through the dam, and thus the flow can be to a certain extent controlled, at least when the water is high the gates can be dropped to impound it, and when the tide is about to turn the gates can be raised so as to let the last flow pass quickly through the channel C. The gates are shown in a diagrammatic or general way, as obviously any suitable arrangement of this kind can be provided. As illustrated they are raised by chains 31 running on drums 32 which are carried by shafts 33 having means, as gear wheels 34 for driving them, so that power can be applied to the shafts to raise the gates while they will of course drop by gravity.

As above noted, any suitable form of large undershot water wheels can be used, but pivoted blades can also be used to advantage on the wheels. For instance, I have shown the wheels in the main views provided with stationary straight paddles 35 arranged between the outer and inner rims 36 and 37, but as shown in Fig. 6 a rim 36ª can be placed nearer the rim 37 and the inner part of the paddle 38 left stationary, while the outer part 39 can be swung one way or the other as shown in Fig. 6, so that the tide will have a better impact on the blade, and also to enable the blade to leave the water with less resistance. The several parts 39 of the paddles or blades are pivoted as shown at 40 on the rim 36ª and they can all be connected by an endless chain 41 running over a guide pulley 42 at some convenient point on the rim 36ª, and being wound upon the drum 43 which is supported in the framework of the wheel and can be turned by a crank 44. Thus when the tide is flowing in one direction the paddle members 39 will be pushed as shown by full lines in Fig. 6, and when the tide is flowing in the opposite direction the members 39 can be shifted to the position shown by dotted lines in the same figure. Any suitable shifting mechanism other than that shown can be used, but as illustrated the wheels will be permitted to turn until the crank 44 comes to some point where it can be conveniently reached from the platform 20, and the paddle members can then be shifted by turning the crank.

From the foregoing description it will be seen that I have devised an apparatus in which power can be developed in great units and conveniently utilized. Further, that the details of the apparatus are not very important and can be changed to a great extent to meet particular conditions without affecting the invention, which lies in the organization and arrangement of the apparatus.

I claim:—

1. A tide water power comprising a raceway located in a channel connecting a basin with tide water so that the water can flow through both the channel and raceway, a series of water wheels arranged one behind the other in the raceway, means for transmitting power from the water wheels, and gates operating independently of the raceway and controlling the flow through the channel.

2. A tide water power comprising a raceway located in a channel connecting a basin with a source of tide water so that part of the water will flow through the raceway and part through the channel, a series of water wheels arranged one behind the other in the raceway, means for transmitting power from the water wheels, and means for controlling the flow of water through the channel independently of the flow through the raceway.

3. A tide water power comprising a raceway located in a channel connecting a basin with a source of tide water so that a part of the water will flow through the channel and part through the raceway, a series of under shot water wheels arranged one behind the other in the raceway, said water wheels being geared to a common shaft, and means for controlling the flow of water through the channel independently of the flow through the raceway.

4. A tide water power comprising a channel connecting a basin with a source of tide water, a raceway for water wheels arranged to receive a part of the flow of water between the basin and the source of tide water, and means independent of the raceway for controlling the flow of water through the channel.

PHILIP J. RENNOLDS.

Witnesses:
WARREN B. HUTCHINSON,
M. G. O'DONNELL.